United States Patent
Kameyama et al.

(10) Patent No.: US 8,137,793 B2
(45) Date of Patent: Mar. 20, 2012

(54) INK COMPOSITION AND HARDENED MATERIAL USING THEREOF

(75) Inventors: Yuji Kameyama, Tokyo (JP); Kazuhiro Jonai, Tokyo (JP); Norio Suzuki, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 67 days.

(21) Appl. No.: 12/719,558

(22) Filed: Mar. 8, 2010

(65) Prior Publication Data

US 2010/0233448 A1 Sep. 16, 2010

(30) Foreign Application Priority Data

Mar. 11, 2009 (JP) .................................. 2009-057244
Mar. 11, 2009 (JP) .................................. 2009-057245
Nov. 25, 2009 (JP) .................................. 2009-267926

(51) Int. Cl.
*B32B 3/10* (2006.01)
*C09D 11/10* (2006.01)

(52) U.S. Cl. ..................... 428/195.1; 524/500; 524/850; 524/853

(58) Field of Classification Search ............... 428/195.1; 524/500, 850, 853
See application file for complete search history.

(56) References Cited

U.S. PATENT DOCUMENTS

| | | | |
|---|---|---|---|
| 6,534,129 B1 * | 3/2003 | Miller et al. | 427/466 |
| 6,558,753 B1 * | 5/2003 | Ylitalo et al. | 427/466 |
| 7,427,317 B2 * | 9/2008 | Sloan | 106/31.13 |
| 2006/0132566 A1 | 6/2006 | Desie et al. | |
| 2008/0075882 A1 | 3/2008 | Hayata | |
| 2009/0087626 A1 * | 4/2009 | Hayata et al. | 428/195.1 |
| 2009/0087627 A1 * | 4/2009 | Watanabe et al. | 428/195.1 |

FOREIGN PATENT DOCUMENTS

| | | |
|---|---|---|
| EP | 1 642 943 A2 | 4/2006 |
| EP | 2 042 572 A1 | 4/2009 |
| EP | 2 042 574 A1 | 4/2009 |
| JP | 2004-211057 | 7/2004 |
| JP | 2005-139017 | 6/2005 |
| JP | 2007-56232 | 3/2007 |
| JP | 2007-525550 | 9/2007 |
| JP | 2008-247964 | 10/2008 |
| WO | WO 02/061002 A2 | 8/2002 |
| WO | WO 2004/108839 A1 | 12/2004 |
| WO | WO 2008/117092 A1 | 10/2008 |

OTHER PUBLICATIONS

Office Action issued Jun. 6, 2011 in European Patent Application No. 10 155 726.2-2102.

* cited by examiner

*Primary Examiner* — David W Wu
*Assistant Examiner* — Vu A Nguyen
(74) *Attorney, Agent, or Firm* — Oblon, Spivak, McClelland, Maier & Neustadt, L.L.P.

(57) ABSTRACT

An active energy ray-curable ink composition having excellent adhesiveness to various base materials and satisfactory ejection stability is provided. An active energy ray-curable inkjet ink composition comprising polymerizable monomers, the polymerizable monomers comprising 60 to 98% by weight of monofunctional monomers, the monofunctional monomers comprising 25 to 65% by weight of isobornyl acrylate and 12.5 to 69% by weight of N-vinyl caprolactam based on the total amount of the polymerizable monomers.

9 Claims, No Drawings

INK COMPOSITION AND HARDENED MATERIAL USING THEREOF

BACKGROUND OF THE INVENTION

1. Field of the Invention

The present invention relates to an active energy ray-curable ink composition.

2. Description of the Related Art

Active energy ray-curable compositions have been traditionally supplied and used for offset printing, silk screen printing, topcoat agents and the like. Particularly, the amount of use of these compositions is increasing in recent years, due to the merits of cost cutdown as a result of simplification of drying processes, a decrease in the amount of volatilization of solvents as an environmental response or the like. Among them, water-based curable compositions and solvent-based curable compositions are predominantly used as inkjet ink, and they can be sorted and used for different applications in accordance with their respective features. For industrial use, these active energy ray-curable compositions have problems that there is limitation on the recipient base material, their water resistance is relatively poor, a large amount of energy is consumed for drying of the ink, ink compositions adhere to the head due to drying, and the like. For that reason, it has been expected to replace those inkjet inks with active energy ray-curable inks which are relatively less volatile.

Active energy ray-curable inks are expected to be used with various base materials such as polyinyl chloride, polycarbonate, acrylic resin and glass. There is an increasing demand for inks that closely adhere to polypropylene (PP) or polyethylene terephthalate (PET) of those soft packaging materials used in packaging.

However, adhesion to base materials largely depends on the affinity of the monomers included in the ink and the base material, and the bonding of the polar moiety. Therefore, it is required to prepare an ink composition suitable for every base material. Furthermore, in order to use in response to various base materials, several kinds of inks suited for the base materials are required. In order to solve such problems, using isobornyl acrylate which has particularly good affinity to various base materials, can be conceived. However, isobornyl acrylate has a problem of large steric hindrance, and is prone to form a film with a low molecular weight when cured. Therefore, the cured film cannot have sufficient strength, and excellent adhesiveness cannot be obtained.

Japanese Patent Application Laid-Open No. 2007-056232 discloses an ink prepared using isobornyl acrylate and N-vinyl caprolactam, which has good stretching processability and can be suitably used in the applications where deformation processing is carried out after inkjet printing when printing is processed on flexible materials. However, the ink contains 2-hydroxy-3-phenoxypropyl acrylate and phenoxyethyl acrylate as essential components, and it is essential that 40% by weight to 90% by weight of phenoxyethyl acrylate is contained based on the total amount of monomers. Furthermore, the ink with the amounts of incorporation disclosed in this document, adheres only to polycarbonates, so that adhesiveness to multiple base materials cannot be obtained.

Japanese Patent Application Laid-Open Nos. 2008-247964, 2004-211057 and 2005-139017 disclose compositions containing isobornyl acrylate and N-vinyl caprolactam. However, these compositions are not for inkjet applications, but are used for optical fiber purposes.

As discussed above, there is a demand for an active energy ray-curable ink composition having good adhesiveness to various base materials and satisfactory ejection stability.

SUMMARY OF THE INVENTION

According to one aspect of the present invention, there is provided an active energy ray-curable inkjet ink composition comprising polymerizable monomers, the polymerizable monomer comprising 60 to 98% by weight of monofunctional monomers, the monofunctional monomers comprising 25 to 65% by weight of isobornyl acrylate, and 12.5 to 60% by weight of N-vinyl caprolactam based on the total amount of the polymerizable monomers.

According to another aspect of the present invention, there is provided the active energy ray-curable inkjet ink composition further comprising a resin having an acid value of 50 mg KOH/g or higher and a weight average molecular weight of 1000 to 20000.

According to still another aspect of the present invention, there is provided a printed matter printed using the active energy ray-curable inkjet ink composition, which is printed on a base material surface treated by a surface modification method of introducing a polar group into the surface of the base material.

According to still another aspect of the present invention, there is provided a printed matter printed using the active energy ray-curable inkjet ink composition.

According to still another aspect of the present invention, there is provided an active energy ray-curable ink composition having good adhesiveness to various base materials and satisfactory ejection stability.

This application is based upon and claims the benefit of priority from Japanese Patent Application No. 2009-057244, filed on Mar. 11, 2009; Japanese Patent Application No. 2009-057245 on filed Mar. 11, 2009; and Japanese Patent Application No. 2009-267926 on filed Nov. 25, 2009, the entire contents of which are incorporated herein by reference.

DETAILED DESCRIPTION OF THE PREFERRED EMBODIMENTS

The active energy ray-curable inkjet ink composition of the present invention comprises polymerizable monomers, the polymerizable monomers comprise 60 to 98% by weight of monofunctional monomers, the monofunctional monomers comprise 25 to 65% by weight of isobornyl acrylate, and 12.5 to 60% by weight of N-vinyl caprolactam based on the total amount of the polymerizable monomers.

It is preferable that the ink composition of the present invention comprises a monofunctional monomer having a solubility parameter (SP) value of 8.5 or less, and a monofunctional monomer having an SP value of 10.3 or more. It is more preferable that the ink composition comprises a 35% by weight or more of the monofunctional monomer having an SP value of 8.5 or less in the ink composition. It is even more preferable that the ink composition comprises 25% by weight or more of the monofunctional monomer having an SP value of 8.5 or less, and 12.5% by weight or more of the monofunctional monomer having an SP value of 10.3 or more.

As the SP values of the monofunctional monomers and the base material are closer, the affinity of the ink is good. Particularly, a monofunctional monomer having an SP value of 8.5 or less has good affinity to polypropylene, which is said to cause particular difficulties in adhesion. Furthermore, although the principle is not clearly understood, a monofunctional monomer having an SP value of 10.3 or more forms an electrostatic bonding with the polar groups produced at the surface of a base material as a result of corona treatment or plasma treatment. Strong adhesiveness cannot be obtained when only a monofunctional monomer having an SP value of 8.5 or less is used. On the contrary, when only a monofunctional monomer having an SP value of 10.3 or more is used, the affinity to the base material is poor, and satisfactory adhesiveness is not obtained. In this regard, when a monofunctional monomer having an SP value of 8.5 or less and a monofunctional monomer having an SP value of 10.3 are combined, an electrostatic bonding with the polar groups at the surface of the base material can be formed to realize strong adhesion, while good affinity with the base material is maintained. Furthermore, when an ink composition contains a monofunctional monomer having an SP value of 8.5 or less and also contains a monofunctional monomer having an SP value of 10.3 or more, the ink composition can be adhered to various base materials.

The solubility parameter (SP value) is a value representing the compatibility between a substance and another substance, and is calculated based on the structural formula of the substance. In the present invention, the SP value was calculated using the calculation method developed by Small. Furthermore, with regard to a polar substance having hydrogen bonding, the SP value was calculated using Hoy and Van Krevelen's correction values.

In order to determine the SP value according to Small's calculation method, it is necessary to examine the density of the substance. The density of a monomer was measured after it was kept at 25° C. for 2 hours, using a 25-ml pycnometer. After the density is measured, the solubility parameter (SP value) was calculated. Upon calculating the solubility parameter (SP value), the following expression was used for the calculation:

$$\delta = \rho \Sigma F/M$$

wherein δ represents the SP value; ρ represents the density; F represents the molecular cohesive energy constant; and M represents the molecular weight of the monomer.

The values of F (molecular cohesive energy constant) was taken from the Proceedings of a Seminar entitled "Calculation and Application of SP values (solubility parameter) of <Polymers and Biopolymers>" (held by Information Organization) on Feb. 28, 2006, from which the values described in Table 10 on page 34, in Table d on page 46, and in Table 2 on page 49 were used. This text is incorporated herein by reference in its entirety.

Examples of the monofunctional monomer having an SP value of 8.5 or less include cyclohexyl acrylate, tetrahydrofurfuryl acrylate, 4-t-butylcyclohexyl acrylate, caprolactone-modified tetrahydrofurfuryl acrylate, isobornyl acrylate, t-butyl acrylate, isobutyl acrylate, isooctyl acrylate, lauryl acrylate, isostearyl acrylate, stearyl acrylate, isoamyl acrylate, trimethylolpropane formal monoacrylate and trifluoroethyl acrylate, but are not limited to these. These compounds may be used singly, or if necessary, may be used in combination of two or more kinds.

Examples of the monofunctional monomer having an SP value of 10.3 or more include acryloylmorpholine, N-vinyl caprolactam, N-vinylpyrrolidone, hydroxyphenoxyethyl acrylate, hydroxyphenoxypropyl acrylate, 2-hydroxyethyl acrylate, 2-hydroxypropyl acrylate, 4-hydroxybutyl acrylate, 2-acryloyloxypropyl phthalate and β-carboxylethyl acrylate, but are not limited to these. These compounds may be used singly, or if necessary, may be used in combination of two or more kinds.

Preferred examples of the monofunctional monomer having an SP value of 8.5 or less include 4-t-butylcyclohexyl acrylate, isobornyl acrylate and lauryl acrylate. Preferred examples of the monofunctional monomer having an SP value of 10.3 or more include acryloylmorpholine, N-vinyl caprolactam, and N-vinylpyrrolidone. It is more preferable to use a combination of monomers selected from preferred monomers, and if necessary, plural monomers may be combined.

It is particularly preferable to combine isobornyl acrylate as the monofunctional monomer having an SP value of 8.5 or less, and N-vinyl caprolactam as the monofunctional monomer having an SP value of 10.3 or more. This combination exhibits, when prepared into ink, excellent adhesion to a surface treated base material, and has a viscosity suitable as an inkjet ink, thus exhibiting satisfactory curability.

Although the principle is not clearly understood, isobornyl acrylate has particularly good affinity to base materials, and exhibits satisfactory wet-spreadability on various base materials. However, since isobornyl acrylate causes large steric hindrance, its rate of polymerization is slower than the rates of other acrylate monomers, and if used as a single substance, isobornyl acrylate is likely to form a low molecular weight film when cured. Therefore, a sufficient cured film strength cannot be obtained, and the cured film itself is destroyed (cohesive failure), so that excellent adhesiveness cannot be obtained. However, when N-vinyl caprolactam is used in combination, cohesive failure can be prevented. This is thought to be because, N-vinyl caprolactam is characterized in having a slow polymerization initiation speed, but having fast reactivity after polymerization initiation, and thus the proportion of N-vinyl caprolactam crosslinking with isobornyl acrylate whose polymerization initiation speed is close to that of N-vinyl caprolactam becomes larger. Therefore, adhesiveness cannot be obtained with isobornyl acrylate only, but when N-vinyl caprolactam is used in combination, adhesiveness to various base materials can be obtained.

In case that isobornyl acrylate and N-vinyl caprolactam are used together in a composition, the composition shows excellent adhesiveness when 25% by weight or more of isobornyl acrylate is contained based on the total amount of the polymerizable monomers, and the composition shows sufficient curability when 65% by weight or less of isobornyl acrylate is contained. Furthermore, when 12.5% by weight or more of N-vinyl caprolactam is contained based on the total amount of the polymerizable monomers, N-vinyl caprolactam suppresses the cohesive failure caused by isobornyl acrylate so that an adhesiveness that is not exhibited by a single substance of isobornyl acrylate can be obtained. Also, when 60% by weight or less of N-vinyl caprolactam is contained, although the principle is not clearly understood, a sufficiently cured film is formed, and the composition has excellent curability and adhesiveness.

More preferably, a combination in which 15% by weight to 55% by weight of N-vinyl caprolactam is contained based on the total amount of the polymerizable monomers, and 35% by weight to 55% by weight of isobornyl acrylate is contained based on the total amount of the polymerizable monomers, is favorable. This combination further improves adhesiveness and curability of the composition.

Alternatively, it is desirable that 15% by weight to 55% by weight of N-vinyl caprolactam is contained based on the total amount of the polymerizable monomers, and 25% by weight to 55% by weight of isobornyl acrylate is contained based on the total amount of the polymerizable monomers, while the total amount of a monofunctional monomer having an SP value of 8.5 or less and isobornyl acrylate is 35% by weight or more based on the total amount of the polymerizable monomers. This combination further improves adhesiveness and curability of the composition.

The ink composition of the present invention may contain, if necessary, a monofunctional monomer other than isobornyl acrylate and N-vinyl caprolactam. Specific examples of the monofunctional monomer include cyclohexyl acrylate, tetrahydrofurfuryl acrylate, 4-t-butylcyclohexyl acrylate, caprolactone-modified tetrahydrofurfuryl acrylate, t-butyl acrylate, isobutyl acrylate, isooctyl acrylate, lauryl acrylate, isostearyl acrylate, stearyl acrylate, isoamyl acrylate, trimethylolpropane formal monoacrylate, trifluoroethyl acrylate, acryloyl morpholine, N-vinyl caprolactam, N-vinylpyrrolidone, hydroxyphenoxyethyl acrylate, hydroxyphenoxypropyl acrylate, 2-hydroxyethyl acrylate, 2-hydroxypropyl acrylate, 4-hydroxybutyl acrylate, 2-acryloyloxypropyl phthalate, β-carboxylethyl acrylate, benzyl acrylate, methylphenoxyethyl acrylate, 2-phenoxyethyl acrylate (or an ethylene oxide and/or propylene oxide adduct monomer thereof), phenoxydiethylene glycol acrylate, 1,4-cyclohexanedimethanol monoacrylate, N-acryloyloxyethyl hexahydrophthalimide 2-methoxyethyl acrylate, methoxytriethylene glycol acrylate, 2-ethoxyethyl acrylate, 3-methoxybutyl acrylate, ethoxyethoxyethyl acrylate, butoxyethyl acrylate, methoxydipropylene glycol acrylate, dipropylene glycol acrylate, ethoxylated succinic acid acrylate, and ω-carboxypolycaprolactone monoacrylate, but the examples are not limited to these. These compounds may be used singly, or may be used in combination of two or more kinds as necessary.

The content of the polymerizable monofunctional monomers is preferably from 60% by weight to 98% by weight, and more preferably from 70% by weight to 98% by weight, based on the total amount of polymerizable monomers. When the content of the monofunctional monomers is 60% by weight or more, contraction of the film upon curing is prevented, and the film has good adhesiveness. Also, when the content of the monofunctional monomers is 98% by weight or less, the cured film itself has high strength, and the film properties are optimal as a cured film.

The ink composition of the present invention may contain a polyfunctional monomer. Examples of the polyfunctional monomer include ethylene glycol di(meth)acrylate, diethylene glycol di(meth)acrylate, polyethylene glycol di(meth) acrylate, 1,6-hexanediol di(meth)acrylate, ethoxylated 1,6-hexanediol diacrylate, neopentyl glycol di(meth)acrylate, polypropylene glycol diacrylate, 1,4-butanediol di(meth) acrylate, 1,9-nonanediol diacrylate, tetraethylene glycol diacrylate, 2-n-butyl-2-ethyl-1,3-propanedioldiacrylate, hydroxypivalic acid neopentyl glycol diacrylate, 1,3-butylene glycol di(meth)acrylate, ethoxylated tripropylene glycol diacrylate, neopentyl glycol-modified trimethylolpropane diacrylate, stearic acid-modified pentaerythritol diacrylate, neopentyl glycol oligoacrylate, 1,4-butanediol oligoacrylate, 1,6-hexanediol oligoacrylate, ethoxylated neopentyl glycol di(meth)acrylate, propoxylated neopentyl glycol di(meth) acrylate, tripropylene glycol di(meth)acrylate, bisphenol A diacrylate, dimethyloltricyclodecane diacrylate, propoxylated bisphenol A di(meth)acrylate, ethoxylated bisphenol A di(meth)acrylate, bisphenol F diacrylate, ethoxylated bisphenol F diacrylate, propoxylated bisphenol F diacrylate, cyclohexanedimethanol di(meth)acrylate, dimethyloldicyclopentane diacrylate, isocyanuric acid diacrylate, propoxylated isocyanuric acid diacrylate, trimethylolpropane triacrylate, hydroxypivalic acid trimethylolpropane triacrylate, ethoxylated phosphoric acid triacrylate, pentaerythritol triacrylate, tetramethylolpropane triacrylate, tetramethylolmethane triacrylate, caprolactone-modified trimethylolpropane triacrylate, propoxylated glyceryl triacrylate, trimethylolpropane oligoacrylate, ethoxylated trimethylolpropane triacrylate, propoxylated trimethylolpropane triacrylate, ethoxylated isocyanuric acid triacrylate, tri(2-hydroxyethyl isocyanurate) triacrylate, tri(meth)allyl isocyanurate, ethylene glycol di(meth)acrylate, diethylene glycol di(meth)acrylate, polyethylene glycol di(meth)acrylate, 1,6-hexanediol di(meth) acrylate, ethoxylated 1,6-hexanediol diacrylate, neopentyl glycol di(meth)acrylate, polypropylene glycol diacrylate, 1,4-butanediol di(meth)acrylate, 1,9-nonanediol diacrylate, tetraethylene glycol diacrylate, 2-n-butyl-2-ethyl-1,3-propanediol diacrylate, hydroxypivalic acid neopentyl glycol diacrylate, 1,3-butylene glycol di(meth)acrylate, trimethylolpropane triacrylate, hydroxypivalic acid trimethylolpropane triacrylate, ethoxylated phosphoric acid triacrylate, ethoxylated tripropylene glycol diacrylate, neopentyl glycol-modified trimethylolpropane diacrylate, stearic acid-modified pentaerythritol diacrylate, pentaerythritol triacrylate, tetramethylolpropane triacrylate, tetramethylolmethane triacrylate, pentaerythritol tetraacrylate, caprolactone-modified trimethylolpropane triacrylate, propoxylated glyceryl triacrylate, tetramethylolmethane tetraacrylate, pentaerythritol tetraacrylate, ditrimethylolpropane tetraacrylate, ethoxylated pentaerythritol tetraacrylate, dipentaerythritol hexaacrylate, caprolactone-modified dipentaerythritol hexaacrylate, dipentaerythritol hydroxypentaacrylate, neopentyl glycol oligoacrylate, 1,4-butanediol oligoacrylate, 1,6-hexanediol oligoacrylate, trimethylolpropane oligoacrylate, pentaerythritol oligoacrylate, ethoxylated neopentyl glycol di(meth)acrylate, propoxylated neopentyl glycol di(meth)acrylate, tripropylene glycol di(meth)acrylate, ethoxylated trimethylolpropane triacrylate, propoxylated trimethylolpropane triacrylate, and the like, but the examples are not limited to these. These monofunctional and polyfunctional monomers may be used singly, or may be used in combination of two or more kinds as necessary.

The ink composition of the present invention may contain an oligomer or a prepolymer in addition to the components described above. Specific examples thereof include "Ebecryl 230, 244, 245, 270, 280/15 IB, 284, 285, 4830, 4835, 4858, 4883, 8402, 8803, 8800, 254, 264, 265, 294/35 HD, 1259, 1264, 4866, 9260, 8210, 1290, 1290K, 5129, 2000, 2001, 2002, 2100, KRM7222, KRM7735, 4842, 210, 215, 4827, 4849, 6700, 6700-20T, 204, 205, 6602, 220, 4450, 770, IRR567, 81, 84, 83, 80, 657, 800, 805, 808, 810, 812, 1657, 1810, IRR302, 450, 670, 830, 835, 870, 1830, 1870, 2870, IRR267, 813, IRR483, 811, 436, 438, 446, 505, 524, 525, 554W, 584, 586, 745, 767, 1701, 1755, 740/40 TP, 600, 601, 604, 605, 607, 608, 609, 600/25 TO, 616, 645, 648, 860, 1606, 1608, 1629, 1940, 2958, 2959, 3200, 3201, 3404, 3411, 3412, 3415, 3500, 3502, 3600, 3603, 3604, 3605, 3608, 3700, 370020H, 3700-20T, 3700-25R, 3701, 3701-20T, 3703, 3702, RDX63182, 6040 and IRR419" manufactured by Daicel-UCB Co., Ltd.; "CN104, CN120, CN124, CN136, CN151, CN2270, CN2271E, CN435, CN454, CN970, CN971, CN972, CN9782, CN981, CN9893 and CN991" manufactured by Sartomer Company, Inc.; "Laromer EA81, LR8713, LR8765, LR8986, PE56F, PE44F, LR8800, PE46T, LR8907, PO43F, PO77F, PE55F, LR8967, LR8981, LR8982, LR8992, LR9004, LR8956, LR8985, LR8987, UP35D, UA19T, LR9005, PO83F, PO33F, PO84F, PO94F, LR8863, LR8869, LR8889, LR8997, LR8996, LR9013, LR9019, PO9026V and PE9027V" manufactured by BASF Corp.; "Photomer 3005, 3015, 3016, 3072, 3982, 3215, 5010, 5429, 5430, 5432, 5662, 5806, 5930, 6008, 6010, 6019, 6184, 6210, 6217, 6230, 6891, 6892, 6893-20R, 6363, 6572 and 3660" manufactured by Cognis Corp.; "Artresin UN-9000HP, 9000PEP, 9200A, 7600, 5200, 1003, 1255, 3320HA, 3320HB, 3320HC, 3320HS, 901T, 1200TPK, 6060PTM and 6060P" manufactured by Negami Industrial Co., Ltd.; "Shikoh UV-6630B, 7000B, 7510B, 7461TE, 3000B, 3200B, 3210EA, 3310B, 3500BA, 3520TL, 3700B, 6100B, 6640B, 1400B, 1700B, 6300B, 7550B, 7605B, 7610B, 7620EA, 7630B, 7640B, 2000B, 2010B, 2250EA and 2750B" manufactured by the Nippon Synthetic Chemical Industry Co., Ltd.; "Kayarad R-280, R-146, R-131, R-205, EX2320, R190, R130, R-300, C-0011, TCR-1234, ZFR-1122, UX-2201, UX-2301, UX3204, UX-3301, UX-4101, UX-6101, UX-7101, MAX-5101, MAX-5100, MAX-3510 and UX4101" manufactured by Nippon Kayaku Co., Ltd.; and the like.

The ink composition of the present invention preferably contains a resin having an acid value of 50 mg KOH/g or higher and a weight average molecular weight of 1000 to 20000. Among them, a resin having a weight average molecular weight of 1000 to 15000 is more preferred. Also, the content of the resin is preferably from 1% by weight to 10% by weight, and more preferably from 2% by weight to 10% by weight, based on the total amount of the polymerizable monomers.

The resin having an acid value of 50 mg KOH/g or higher has enhanced adhesiveness to base materials, as the polar group generated at the surface of the printed base material and the polar moiety of the resin form an electrostatic bonding. Particularly, when a resin having an acid value of 50 mg KOH/g or higher is introduced, the adhesiveness to polypropylene (PP) or polyethylene terephthalate (PET) is enhanced. Since PP or PET has many non-polar parts, if only the resin having an acid value is used, the wettability to PP or PET is insufficient, and excellent adhesiveness cannot be obtained. However, when the resin is used in combination with isobornyl acrylate, which has good wettability to PP or PET, and with N-vinyl caprolactam, which prevents cohesive failure, the resin binds with the polar moieties generated by corona treatment or the like, and stronger adhesiveness can be exhibited. Furthermore, upon considering the injection properties, a resin having a weight average molecular weight of 20000 or less is preferred.

Examples of the resin include acrylic resins, styrene-acrylic acid copolymer resins, styrene-maleic copolymer resins, vinyl chloride-vinyl acetate copolymers, vinyl chloride-vinyl acetate-maleic acid copolymer resins, polyester resins, polypropylene resins, polylactic acid resins, cellulose resins, cellulose acetate resins, butyral resins and the like. It is desirable to use an acrylic acid resin, a styrene-acrylic acid copolymer resin, a styrene-maleic acid copolymer resin or a polyester resin, as a resin having good solubility in acrylate monomers and/or oligomers and/or prepolymers.

When 1% by weight or more of the resin having an acid value of 50 mg KOH/g or more is contained based on the total amount of the polymerizable monomers, adhesiveness of the composition is enhanced, and when 2% by weight or more of the resin is contained, the adhesiveness is further enhanced. When the viscosity and storage stability of the composition as an inkjet ink are taken into consideration, it is preferable that 10% by weight or less of the resin is contained based on the total amount of the polymerizable monomers.

It is preferable that a surface adjusting agent be added to the ink composition of the present invention in order to enhance wettability to base materials. Specific examples of the surface adjusting agent include "BYK-300, 302, 306, 307, 310, 315, 320, 322, 323, 325, 330, 331, 333, 337, 340, 344, 370, 375, 377, 350, 352, 354, 355, 356, 358N, 361N, 357, 390, 392, UV3500, UV3510 and UV3570" manufactured by BYK Chemie Corp.; and "Tegorad-2100, 2200, 2250, 2500 and 2700" manufactured by Tego Chemie Corp.; and the like. These surface adjusting agents may be used singly, or may be used in combination of two or more kinds as necessary.

The composition contains 0.001 to 5% by weight of the surface adjusting agent. When the content is 0.001% by weight or more, the composition has excellent wet-spreadability, and when the content is 5% by weight or less, the surface adjusting agent is oriented at the ink surface, and wettability is improved.

The ink composition of the present invention is cured by active energy rays. Active energy rays mean energy rays which affect the electron orbital of an object to be irradiated, and can trigger the polymerization reactions of radicals, cations, anions and the like, such as electron beams, ultraviolet rays and infrared rays, but the active energy rays are not limited to these as long as they are energy rays inducing a polymerization reaction.

The ink composition of the present invention may contain an organic solvent in order to decrease the viscosity of the ink and to enhance wet-spreadability on base materials.

Examples of the organic solvent include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monoethyl ether propionate, ethylene glycol monobutyl ether propionate, diethyl diglycol, diethylene glycol dialkyl ether, tetraethylene glycol dialkyl ether, diethylene glycol monomethyl ether propionate, diethylene glycol monoethyl ether propionate, diethylene glycol monobutyl ether propionate, propylene glycol monomethyl ether propionate, dipropylene glycol monomethyl ether butyrate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate and dipropylene glycol monomethyl ether butyrate; glycol diacetates such as ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, ethylene glycol acetate dibutyrate, diethylene glycol acetate propionate, diethylene glycol acetate butyrate, diethylene glycol propionate butyrate, diethylene glycol dipropionate, diethylene glycol acetate dibutyrate, propylene glycol acetate propionate, propylene glycol acetate butyrate, propylene glycol propionate butyrate, propylene glycol dipropionate, propyelen glycol acetate dibutyrate, dipropylene glycol acetate propionate, dipropylene glycol acetate butyrate, dipropylene glycol propionate butyrate, dipropylene glycol acetate butyrate, dipropylene glycol propionate butyrate, dipropylene glycol dipropionate and dipropylene glycol acetate dibutyrate; glycols such as ethylene glycol, diethylene glycol, triethylene glycol, propylene glycol and dipropylene glycol; glycol ethers such as ethylene glycol monobutyl ether, propylene glycol monomethyl ether, propylene glycol monobutyl ether, diethylene glycol monoethyl ether, diethylene glycol monobutyl ether, dipropylene glycol monomethyl ether, dipropylene glycol monoethyl ether, dipropylene glycol monobutyl ether, propylene glycol, n-propyl ether, triethylene glycol monomethyl ether, triethylene glycol monoethyl ether, triethylene glycol monobutyl ether and tripropylene glycol monomethyl ether; and lactic acid esters such as methyl lactate, ethyl lactate, propyl lactate and butyl lactate. Among these, tetraethylene glycol dialkyl ether, ethylene glycol monobutyl ether acetate and diethyl diglycol are preferred.

The ink composition of the present invention represents a liquid that is printed or applied on the surface of a base material. The ink composition of the present invention can be used for coating applications, if the ink composition does not contain any coloring component. The ink composition of the present invention may contain a coloring component. If the ink composition contains a coloring component, the composition can be used as a material for indicating graphics, writing, photographs and the like. As this coloring component, conventional dyes or pigments are widely used; however, in view of weather resistance, pigments are frequently used.

The pigment component may be an achromatic pigment such as carbon black, titanium oxide or calcium carbonate, or a chromatic organic pigment. Specific examples include the following, but are not limited to these examples. Examples of organic pigments include insoluble azo pigments such as toluidine red, toluidine maroon, Hansa yellow, benzidine yellow and pyrazolone red; soluble azo pigments such as lithol red, Helio Bordeaux, pigment scarlet and permanent red 2B; derivatives of vat dyes such as alizarin, indantrone and thioindigo maroon; phthalocyanine-based organic pigments such as phthalocyanine blue and phthalocyanine green; quinacridone-based organic pigments such as quinacridone red and quinacridone magenta; perylene-based organic pigments such as perylene red and perylene scarlet; isoindolinone-based organic pigments such as isoindolinone yellow and isoindolinone orange; pyranthrone-based organic pigments such as pyranthrone red and pyranthrone orange; thioindigo-based organic pigments; condensed azo-based organic pigments, benzimidazolone-based organic pigments; quinophthalone-based organic pigments such as quinophthalone yellow; isoindoline-based organic pigments such as isoindoline yellow; and as other pigments, flavanthrone yellow, acylamide yellow, nickel azo yellow, copper azomethine yellow, perinone orange, anthrone orange, dianthraquinonyl red, dioxazine violet, and the like.

When those organic pigments are presented in their Color Index (C.I.) numbers, there may be mentioned C.I. Pigment Yellow 12, 13, 14, 17, 20, 24, 74, 83, 86 93, 109, 110, 117, 120, 125, 128, 129, 137, 138, 139, 147, 148, 150, 151, 153, 154, 155, 166, 168, 180 and 185; C.I. Pigment Orange 16, 36, 43, 51, 55, 59 and 61; C.I. Pigment Red 9, 48, 49, 52, 53, 57, 97, 122, 123, 149, 168, 177, 180, 192, 202, 206, 215, 216, 217, 220, 223, 224, 226, 227, 228, 238 and 240; C.I. Pigment Violet 19, 23, 29, 30, 37, 40 and 50; C.I. Pigment. Blue 15, 15:1, 15:3, 15:4, 15:6, 22, 60 and 64; C.I. Pigment Green 7 and 36; C.I. Pigment Brown 23, 25 and 26; and the like.

Specific examples of carbon black include "Special Black 350, 250, 100, 550, 5, 4, 4A and 6", and "Printex U, V, 140U, 140V, 95, 90, 85, 80, 75, 55, 45, 40, P, 60, L6, L, 300, 30, 3, 35, 25, A and G" manufactured by Degussa, Inc.; "REGAL 400R, 660R, 330R and 250R", and "MOGUL E and L" manufactured by Cabot Corp.; "MA7, 8, 11, 77, 100, 100R, 100S, 220 and 230", and "#2700, #2650, #2600, #200, #2350, #2300, #2200, #1000, #990, #980, #970, #960, #950, #900, #850, #750, #650, #52, #50, #47, #45, #45L, #44, #40, #33, #332, #30, #25, #20, #10, #5, CF9, #95 and #260" manufactured by Mitsubishi Chemical Corp.; and the like.

Specific examples of titanium oxide include "Tipaque CR-50, 50-2, 57, 80, 90, 93, 95, 953, 97, 60, 60-2, 63, 67, 58, 582 and 85", "Tipaque R-820, 830, 930, 550, 630, 680, 670, 580, 780, 780-2, 850 and 855", "Tipaque A-100 and 220", "Tipaque W-10", "Tipaque PF-740 and 744", "TTO-55(A), 55(B), 55(C), 55(D), 55(S), 55(N), 51(A) and 51(C)", "TTO-S-1 and 2", and "TTO-M-1 and 2" manufactured by Ishihara Corp.; "Titanix JR-301, 403, 405, 600A, 605, 600E, 603, 805, 806, 701, 800 and 808", and "Titanix JA-1, C, 3, 4 and 5" manufactured by Tayca Corp.; "Ti-Pure R-900, 902, 960, 706 and 931" manufactured by DuPont Company; and the like.

Among the pigments mentioned above, quinacridone-based organic pigments, phthalocyanine-based organic pigments, benzimidazolone-based organic pigments, isoindolinone-based organic pigments, condensed azo-based organic pigments, quinophthalone-based organic pigments, isoindoline-based organic pigments and the like are preferred because of their excellent light resistance. The organic pigment is preferably a fine pigment having an average particle size of 10 to 150 nm as measured by laser light scattering. When the average particle size of the pigment is 10 nm or more, light resistance is excellent, and when the particle size is 150 nm or less, dispersion stability may be easily maintained, while precipitation of pigment hardly occurs.

Micronization of the organic pigment can be carried out by the following method. That is, at least three components such as an organic pigment, a water-soluble inorganic salt in an amount of three-fold the weight of the organic pigment, and a water-soluble solvent, are mixed into a clay-like mixture, the mixture is strongly kneaded with a kneader or the like to micronize the pigment, subsequently the kneading product is introduced into water, and then the mixture is stirred with a high speed mixer or the like to form a slurry. Subsequently, the slurry is repeatedly filtered and washed with water, so as to remove water-soluble inorganic salts and water-soluble solvent. In the micronization process, a resin, a pigment dispersant and the like may be added.

Examples of the water-soluble inorganic salts include sodium chloride, potassium chloride and the like. The content of these inorganic salts is preferably more than or equal to three-fold the weight of the organic pigments, and more preferably less than or equal to 20-fold the weight of the organic pigments. When the amount of the inorganic salts is 3 times or more by weight, a treated pigment having a desired size can be obtained. When the amount of the inorganic salts is 20 times or less by weight, the washing treatment during the subsequent processes can be easily carried out, and the subsequent throughput of the organic pigment is increased.

The water-soluble solvent is used to make an appropriate clay state of the organic pigment and the water-soluble inorganic salts used as a crushing aid, and to thereby efficiently carry out sufficient crushing. The solvent is not particularly limited as long as it is a solvent that is soluble in water, but since the temperature increases at the time of kneading and brings a state in which the solvent easily evaporates, a solvent having a high boiling point of 120 to 250° C. is preferred from the viewpoint of safety. Examples of the water-soluble solvent include 2-(methoxymethoxy)ethanol, 2-butoxyethanol, 2-(isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, low molecular weight polypropylene glycol, and the like, but are not limited to these.

The ink composition preferably contains 0.1 to 30% by weight of the pigment, so as to obtain sufficient concentration and sufficient light resistance.

It is preferable that the ink composition of the present invention contains a pigment dispersant to enhance the dispersibility of the pigment and the storage stability of the ink. Examples of the pigment dispersant include hydroxyl group-containing carboxylic acid esters, salts of a long-chain polyaminoamide and a high molecular weight acid ester, salts of a high molecular weight polycarboxylic acid, salts of a long-chain polyaminoamide and a polar acid ester, high molecular weight unsaturated acid esters, high molecular weight copolymers, modified polyurethane, modified polyacrylate, polyether ester type anionic active agents, naphthalenesulfonic acid-formalin condensate salts, aromatic sulfonic acid-formalin condensate salts, polyoxyethylene alkyl phosphoric acid esters, polyoxyethylene nonyl phenyl ethers, stearylamine acetate, and the like, but the examples are not limited to these.

Specific examples of the pigment dispersant include "Anti-Terra-U (polyaminoamide phosphate)," "Anti-Terra-203/204 (high molecular weight polycarboxylate)," "Disperbyk-101 (polyaminoamide phosphate and acid ester), 107 (hydroxyl group-containing carboxylic acid ester), 110, 111 (copolymers containing acid groups), 130 (polyamide), 161, 162, 163, 164, 165, 166, 170 (high molecular weight copolymers)," "400," "Bykumen (high molecular weight unsaturated acid ester)," "BYK-P104, P105 (high molecular weight unsaturated acid polycarboxylic acid)," "P104S, 240S (high molecular weight unsaturated acid polycarboxylic acid and silicone-based)," and "Lactimon (long-chain amine and unsaturated polycarboxylic acid and silicone)," all manufactured by BYK Chemie Corp.

Other examples include "Efka 44, 46, 47, 48, 49, 54, 63, 64, 65, 66, 71, 701, 764, 766," and "Efka Polymer-100 (modified polyacrylate), 150 (aliphatically modified polymer), 400, 401, 402, 403, 450, 451, 452, 453 (modified polyacrylate), and 745 (copper phthalocyanine-based)" manufactured by Efka Chemicals, Inc.; "Flowlen TG-710 (urethane oligomer)," "Flownon SH-290, SP-1000," and "Polyflow No. 50E, No. 300 (acrylic copolymers)," manufactured by Kyoeisha Chemical Co., Ltd.; and "Disparlon KS-860, 873SN, 874 (polymeric dispersants), #2150 (aliphatic polyvalent carboxylic acid), and #7004 (polyether ester type)" manufactured by Kusumoto Chemicals, Ltd.

Still other examples include "Demol RN, N (naphthalenesulfonic acid-formalin condensate sodium salts), MS, C, SN-B (aromatic sulfonic acid-formalin condensate sodium salt), EP," "Homogenol L-18 (polycarboxylic acid type polymer)," "Emulgen 920, 930, 931, 935, 950, 985 (polyoxyethylene nonyl phenyl ethers)," and "Acetamin 24 (coconut amine acetate), 86 (stearylamine acetate)" manufactured by Kao Corp.; "Solsperse 5000 (phthalocyanine ammonium salt-based), 13940 (polyester amine-based), 17000 (aliphatic amine-based), 24000GR, 32000, 33000, 39000, 41000, 53000" manufactured by Lubrizol Corp.; "Nikol T106 (polyoxyethylene sorbitan monooleate), MYS-IEX (polyoxyethylene monostearate), Hexagline 4-0 (hexaglyceryl tetraoleate)" manufactured by Nikko Chemical Co., Ltd.; "Ajisper-PB821, 822, 824, 827, 711" manufactured by Ajinomoto Fine Techno Co., Inc.; "TEGODisper 685" manufactured by Tego Chemie Service Corp.; and the like.

The pigment dispersant is preferably contained in an amount of 0.01 to 10% by weight in the ink composition.

It is preferable that an acidic derivative of an organic pigment be incorporated into the ink composition of the present invention at the time of dispersing the pigment, in order to further enhance the dispersibility of the pigment and the storage stability of the ink.

In the case of using ultraviolet rays as the active energy rays, the ink composition of the present invention may contain a photoradical polymerization initiator. As the photoradical polymerization initiator, a molecule cleaving type or hydrogen withdrawing type initiator is suitable for the present invention. Specific suitable examples include benzoin isobutyl ether, 2,4-diethylthioxantone, 2-isopropylthioxantone, benzyl, 2,4,6-trimethylbenzoyl diphenylphosphine oxide, 2-benzyl-2-dimethylamino-1-(4-morpholinophenyl)-butan-1-one, bis(2,4,6-dimethoxybenzoyl)-2,4,4-trimethylpentylphosphine oxide, 1,2-octanedione, 1-(4-(phenylthio)-2,2-(O-benzoyloxime)), oligo(2-hydroxy-2-methyl-1-(4-(1-methylvinyl)phenyl)propanone and the like. In addition to these, as molecule cleaving type initiators, 1-hydroxycyclohexyl phenyl ketone, benzoin ethyl ether, benzyl dimethyl ketal, 2-hydroxy-2-methyl-1-phenylpropan-1-one, 1-(4-isopropylphenyl)-2-hydroxy-2-methylpropan-1-one and 2-methyl-1-(4-methylthiophenyl)-2-morpholinopropan-1-one and the like may be used in combination, or benzophenon, 4-phenylbenzophenone, isophthalphenone, 4-benzoyl-4'-methyldiphenyl sulfide and the like, which are hydrogen withdrawing type photopolymerization initiators, can also be used in combination.

Among them, a composition containing oligo(2-hydroxy-2-methyl-1-(4-(1-methylvinyl)phenyl)propanone and 2,4,6-trimethylbenzoyldiphenylphosphine oxide has a satisfactory rate (speed) of curing, and can give a blocking-free printed matter.

Many of the conventional photopolymerization initiators have a single site of molecular cleavage, but the aforementioned two photopolymerization initiators have two or more sites of molecular cleavage. Therefore, after a cleavage due to active energy irradiation, the initiators can react with the polymerizable monomers at plural sites. Accordingly, the molecular weight of the polymerization reaction product in the cured film can be made high. Blocking is believed to be caused by unreacted monomers, or dimers or trimers that have been finished with polymerization in their low molecular weight state, remaining in large quantities in the cured film. When the molecular weight of the polymerization reaction product in the cured film is made high by using a photopolymerization initiator having two or more sites of cleavage as a photopolymerization initiator, blocking-free printed matters can be obtained.

Photopolymerization initiators are classified into intramolecular bond cleaving type and intermolecular hydrogen withdrawing type. The oligo(2-hydroxy-2-methyl-1-(4-(1-methylvinyl)phenyl)propanone of the present invention is classified into the acetophenone class, which occupies a major portion of the intramolecular bond cleaving type, and has features such as rapid polymerization, less yellowing due to the photoacid value, and good storage stability, as compared with the intermolecular hydrogen withdrawing type.

Furthermore, 2,4,6-trimethylbenzoyldiphenylphosphine oxide has an absorption peak in the wavelength range of 350 nm to 395 nm. Since this compound utilizes light on the longer wavelength side compared to the light absorbed by oligo(2-hydroxy-2-methyl-1-(4-(1-methylvinyl)phenyl)propanone, the penetration depth of the irradiated light is increased, so that curing inside the film is accelerated. As a result of using a photopolymerization initiator having an absorption peak in the wavelength range mentioned above, the rate of curing is increased.

Furthermore, a sensitizer may also be used in conjunction with the photoradical polymerization initiator. As the sensitizer, amines that do not undergo an addition reaction with the previously mentioned polymerizable components, such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine and 4,4'-bis(diethylamino)benzophenone, can be used in combination. Of course, in regard to the photoradical polymerization initiator or sensitizer, it is preferable to select and use those which have excellent solubility in ultraviolet-curable compounds and do not inhibit ultraviolet permeability.

The photopolymerization initiator is preferably contained at a proportion of 2 to 20% by weight based on the polymerizable monomers. When the content is 2% by weight or more, the rate of curing is excellent, and when the content is 20% by weight or less, the composition is economically efficient and is free of dissolution residues. If there are dissolution residues remaining, when the residues are dissolved by applying heat, the viscosity of the ink increases, and there arises a problem that the inkjet ejectability is deteriorated.

The absorption spectrum of the photopolymerization initiator was measure by using a spectrophotometer (U-3300 manufactured by Hitachi, Ltd.), by dissolving the photopolymerization initiator in acetonitrile at 0.1% by weight, and using a 1-cm quartz cell. The absorption peak as described in the present invention means a peak corresponding to an absorbance of 0.5 or greater under the above measurement conditions. Many of acylphosphine oxide-based photopolymerization initiators have absorption peaks with an intensity of 0.5 or greater in the wavelength range of 350 nm to 395 nm under the above-described measurement conditions.

The ink composition of the present invention preferably contains a polymerization inhibitor, in order to increase the stability over time and the on-board stability in the recording apparatus of the ink. Examples of the polymerization inhibitor include hydroquinone, p-methoxyphenol, t-butylcatechol, pyrogallol, and butylhydroxytoluene. The ink composition preferably comprises 0.01 to 5% by weight of the polymerization inhibitor.

The ink composition of the present invention can contain, if necessary, various additives such as a plasticizer, a surface adjusting agent, an ultraviolet blocking agent, a photostabilizer, and an antioxidant.

The ink composition of the present invention is produced by thoroughly dispersing the pigment together with the monomers and the pigment dispersant, using a conventional dispersing machine such as a sand mill. It is preferable to prepare in advance a pigment concentrate at a high concentration, and to dilute the concentrate with the monomers. Sufficient dispersion can be achieved even with a conventional dispersing machine, and therefore, the dispersion process does not take excess dispersion energy and does not require an extensive dispersing time. Thus, alteration of the ink components hardly occurs at the time of dispersion, and an ink having excellent stability is produced. It is preferable to filter the ink through a filter having a pore size of 3 μm or less, and preferably 1 μm or less.

It is preferable for the ink composition of the present invention to have the viscosity at 25° C. adjusted as high as 5 to 200 mPa·s. An ink having a viscosity at 25° C. of 5 to 200 mPa·s exhibits particularly stabilized ejection properties with a conventional head with a frequency of 4 to 10 KHz, and even with a high-frequency head with a frequency of 10 to 50 KHz.

When the viscosity is 5 mPa·s or higher, the ink exhibits excellent followability in ejection even in a high-frequency head, and when the viscosity is 200 mPa·s or less, the ink has excellent ejection stability.

It is preferable that the electrical conductivity of the inkjet ink of the present invention be adjusted to 10 μS/cm or less in piezoelectric heads, and that the ink be prepared into an ink which is free of electrical corrosion inside a head. For the continuous type, adjustment in the electrical conductivity by an electrolyte is needed, and in this case, it is preferable to adjust the electrical conductivity to 0.5 mS/cm or higher.

At the time of using the inkjet ink of the present invention, first, this inkjet ink is supplied to the printer head of a printer of inkjet recording mode, the ink is ejected from this printer head onto a base material, and then the ink is irradiated with active energy rays such as ultraviolet rays or an electron beam. Thereby, the composition on the printing medium is rapidly cured.

Here, with regard to the light source of the active energy rays, in the case of irradiating ultraviolet rays, for example, a high pressure mercury lamp, a metal halide lamp, a low pressure mercury lamp, an ultrahigh pressure mercury lamp, an ultraviolet laser, an LED and sunlight can be used. In the case of curing under an electron beam, the curing is usually performed using an electron beam with an energy of 300 eV or less, but it is also possible to instantaneously cure the ink at an exposure dose of 1 to 5 Mrad.

Examples of the printing base material that can be used in the present invention include plastic base materials such as polycarbonate, hard vinyl chloride, soft vinyl chloride, polystyrene, expanded polystyrene, PMMA, polypropylene, polyethylene and PET, and mixtures or modification products thereof, as well as glass, metallic base materials such as stainless, wood, and the like.

The surface treatment method for a base material according to the present invention refers to a method for surface modification which generates polar groups at the surface of a base material, such as corona treatment or plasma treatment. The corona treatment or the plasma treatment is a type of electric discharge treatment, and is a treatment intended for introducing oxygen-containing groups into the surface of a polymer base material. Among the oxygen-containing groups, particularly when a carboxyl group or the like is introduced, the surface of the base material can have polar groups.

The active energy ray-curable inkjet ink composition has satisfactory affinity to non-polar base materials such as polypropylene, while the composition exhibits strong bonding with base materials via the polar moieties generated by corona treating or plasma treating a base material. Thus, the ink composition can manifest excellent adhesiveness.

EXAMPLES

Hereinafter, the present invention will be explained in more detail by way of Examples, but the following Examples are not intended to limit the claimed scope of the present invention by any means. The term "parts" as used in the Examples represents "parts by weight."

(Pigment Dispersion A)

First, a pigment dispersion A was produced at the following composition. The dispersion shown below was prepared by introducing a pigment and a dispersant into a monomer, stirring the mixture to a uniform state using a high speed mixer or the like, and then dispersing the resulting mill base with a horizontal type sand mill for about one hour.

| | |
|---|---|
| Special Black 350 (carbon black pigment manufactured by Degussa, Inc.) | 30 parts |
| Solsperse 32000 (pigment dispersant manufactured by Lubrizol Corp.) | 6 parts |
| Phenoxyethyl acrylate | 64 parts |

(Polyester Resin (A-1) and Polyester Resin (A-2))

Furthermore, hydrogenated bisphenol A, 1,6-hexanediol and phthalic anhydride were used to obtain a polyester resin (A-1) having an acid value of 50 mg KOH/g and a weight average molecular weight of 1000, and a polyester resin (A-2) having an acid value of 50 mg KOH/g and a weight average molecular weight of 25000.

Examples 1 to 11

The pigment dispersion A was prepared into inks having the mixing compositions indicated in Table 1, and each of the ink compositions was stirred for 2 hours. Subsequently, it was confirmed that there were no dissolution residues, and the ink composition was filtered through a membrane filter to remove coarse particles. Thus, an active energy ray-curable composition was obtained. This active energy ray-curable composition was used to print on various base materials using an inkjet printer equipped with a UV lamp, under the conditions of 720 dpi×720 dpi (4-pass bidirectional printing), and thus coating films were obtained.

The printing conditions described above are as follows. Printing was performed using the ink produced as described above and using an inkjet printer equipped with a head having a piezoelectric element which can be heated up to 50° C. Letter printing was performed at a resolution of 720 dpi×720 dpi with 8-pass, and an H bulb manufactured by Integration Technology, Ltd. at a power output of 100 W was used as the ultraviolet lamp. As the printing base materials, polypropylene (Idemitsu Super Purelay: Idemitsu resin), PET (Diafoil: Mitsubishi resin), PVC (Hishi Plate 302: Mitsubishi resin), acrylic (Acrylite L#001: Mitsubishi Rayon), and glass (#0050: Matsunami Glass Ind., Ltd.) were used. Polypropylene and PET were subjected to a corona treatment.

Examples 12 to 23

Inks were produced in the same manner as in Examples 1 to 11, as indicated in Table 2, and printing and curing were carried out.

Comparative Examples 1 to 10

Similarly, inks were produced as indicated in Table 3, and printing and curing were carried out.

(SP Value)

The SP value according to the present invention was calculated using Small's calculation method. For polar substances having hydrogen bonding, the SP value was calculated using Hoy and van Krevelen's correction values. The density of the monomer was made constant at a temperature of 25° C. for 2 hours, and then the density was measured using a 25-ml pycnometer. After the density was measured, the solubility parameter (SP value) was calculated. The solubility parameter (SP value) was calculated using the following expression:

$$\delta = \rho \Sigma F/M$$

wherein $\delta$ represents the SP value; $\rho$ represents the density; F represents the molecular cohesive energy constant; and M represents the molecular weight of the monomer.

The values of F (molecular cohesive energy constant) was taken from the Proceedings of a Seminar entitled "Calculation and Application of SP values (solubility parameter) of <Polymers and Biopolymers>" (held by Information Organization) on Feb. 28, 2006, from which the values described in Table 10 on page 34, in Table d on page 46, and in Table 2 on page 49 were used.

(Acid Value)

The acid value is the number of mg of potassium hydroxide required for neutralizing free fatty acids, resin acids and the like contained in 1 g of a sample, and the measurement of the acid value was carried out by the "Test Method for Acid Value, Saponification value, Ester value, Iodine value and Hydroxy value and Unsaponifiable materials of Chemical products" of JIS K0070.

(Molecular Weight)

The weight average molecular weight of a resin in the Examples was measured by a gel permeation chromatography (GPC) method, by dissolving 1 part of the resin in 99 parts of tetrahydrofuran, and the molecular weight was calculated relative to styrene standards.

(Adhesion)

The adhesiveness to a base material was determined from the degree of adhesion of a coating film to the base material, which was found by cross-cutting a coating film obtained after curing, into 100 pieces at an interval of 1 mm, adhering Cellophane tape to the crosscut parts, rubbing the tape surface with an eraser to achieve sufficient adhesion of the Cellophane tape to the coated surface, and then peeling off the Cellophane tape at 90°.

x: The cured film is 100% peeled off;
Δ: Less than 75% of the cured film remains behind;
○: From 75% to less than 100% of the cured film remains behind;
◎: The cured film is not at all peeled off.

(Strength of Cured Film)

When the adhesiveness was evaluated as described above, the base material to which the cured film was adhered was used to evaluate the strength of the cured film, by observing the cohesive failure from the degree of peeling (delamination) of the cured film.

-: There is no base material to be adhered, and evaluation cannot be made;
x: 75% or more of the partially peeled cured film delaminates from the cured film layer;
Δ: From 10% to less than 75% of the partially peeled cured film delaminates from the cured film layer;
○: From 1% to less than 10% of the partially peeled cured film delaminates from the cured film layer;
◎: The partially peeled cured film undergoes no delamination from the cured film layer, or the cured film is not at all peeled off.

(Ejectability)

The inks produced as described above were respectively subjected to continuous ejection for one hour under the printing conditions described above. The number of lines (ejection clogging) generated at this time was counted, and thus ejectability evaluation was carried out.

◎: Ejection clogging does not occur;
○: Defective ejection was observed in 0 to less than 2% of heads based on the total number of heads (excluding 0%);
Δ: Defective ejection was observed in from 2 to less than 5% of heads based on the total number of heads;
x: Defective ejection was observed in 5% or more of heads based on the total number of heads.

(Curability)

Each of the inks produced as described above was applied to a thickness of 12 μm using a bar coater, and was cured using an H bulb manufactured by Integration Technology, Ltd. At that time, the minimum total UV dose at which the ink cured was measured, and an evaluation of curability was carried out. The irradiance in the UVA region (320 nm to 390 nm) and the total UV dose were measured using an integrated radiometer, UV Power Puck S/N8202, and the irradiance was evaluated under constant conditions at 580 mW/cm$^2$. The time point at which tackiness of the ink cured film disappeared was determined as being cured.

◎: Curing occurred at a total UV dose of less than 150 mJ/cm$^2$;

○: Curing occurred at a total UV dose of 150 mJ/cm² to 200 mJ/cm²;

Δ: Curing occurred at a total UV dose of 200 mJ/cm² to 250 mJ/cm²;

x: Curing occurred at a total UV dose of 250 mJ/cm² or more.

The results of measurements obtained as described above are presented in Tables 1 to 3.

TABLE 1

| | | | Sp value | Acid value | Mw | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|---|---|
| Pigment | | Carbon black | | | | 2 | 2 | 2 | | | | 2 | 2 | 2 | 2 | 2 |
| Mono-functional monomer | | Phenoxyethyl acrylate | 9.7 | | | 20 | 15 | 10 | 20 | 15 | | 20 | 20 | 20 | 20 | 20 |
| | | Lauryl acrylate | 8.3 | | | 25 | | | 25 | | | 30 | 5 | | 30 | |
| | | Isobornyl acrylate | 7.2 | | | 30 | 60 | 30 | 30 | 60 | 35 | 30 | 30 | 30 | 30 | 30 |
| | | N-vinyl caprolactam | 10.5 | | | 15 | 15 | 55 | 15 | 15 | 55 | 15 | 15 | 15 | 15 | 15 |
| | | Vinyl formamide | 9.3 | | | | | | | | | | | | | |
| Bi-functional monomer | | Hydroxypivalic acid neopentyl glycol diacrylate | | | | 10 | 10 | 5 | 10 | 10 | 10 | 5 | 30 | 35 | | |
| | | R551 | | | | | | | | | | | | | 5 | 35 |
| Resin | Styrene acrylic acid | ARUFON UH-2000 | | 0 | 11000 | | | | | | | | | | | |
| | | JONCRYL 815 | | 40 | 10000 | | | | | | | | | | | |
| | | JONCRYL 611 | | 53 | 8100 | | | | | | | | | | | |
| | | JONCRYL 586 | | 108 | 4600 | 2 | 2 | 2 | 2 | 2 | 2 | 2 | 2 | 2 | 2 | 2 |
| | | ARUFON UC-3920 | | 240 | 15000 | | | | | | | | | | | |
| | | JONCRYL 690 | | 240 | 17000 | | | | | | | | | | | |
| | Styrene maleic acid | 2625P | | 50 | 5000 | | | | | | | | | | | |
| | Poly-ester | A-1 | | 50 | 1000 | | | | | | | | | | | |
| | | A-2 | | 50 | 25000 | | | | | | | | | | | |
| | Acrylic acid | ARUFON UC-3900 | | 100 | 4600 | | | | | | | | | | | |
| Polymerization inhibitor | | BHT | | | | 1 | 1 | 1 | 1 | 1 | 1 | 1 | 1 | 1 | 1 | 1 |
| Polymerization initiator | | TPO | | | | 2.5 | 2.5 | 2.5 | 2.5 | 2.5 | 2.5 | 2.5 | 2.5 | 2.5 | 2.5 | 2.5 |
| | | 369 | | | | 2.5 | 2.5 | 2.5 | 2.5 | 2.5 | 2.5 | 2.5 | 2.5 | 2.5 | 2.5 | 2.5 |
| | | Esa-one | | | | 2.5 | 2.5 | 2.5 | 2.5 | 2.5 | 2.5 | 2.5 | 2.5 | 2.5 | 2.5 | 2.5 |
| | | 819 | | | | 2.5 | 2.5 | 2.5 | 2.5 | 2.5 | 2.5 | 2.5 | 2.5 | 2.5 | 2.5 | 2.5 |
| Evaluation | Adhesion | PP | | | | ◎ | ◎ | ◎ | ◎ | ◎ | ◎ | ◎ | ◎ | ○ | ◎ | ○ |
| | | PET | | | | ◎ | ◎ | ◎ | ◎ | ◎ | ◎ | ◎ | ◎ | ○ | ◎ | ○ |
| | | PVC | | | | ◎ | ◎ | ◎ | ◎ | ◎ | ◎ | ◎ | ◎ | ◎ | ◎ | ◎ |
| | | Acrylic | | | | ◎ | ◎ | ◎ | ◎ | ◎ | ◎ | ◎ | ◎ | ○ | ◎ | ○ |
| | | Glass | | | | ◎ | ◎ | ◎ | ◎ | ◎ | ◎ | ◎ | ◎ | ○ | ◎ | ○ |
| | | Ejectability | | | | ◎ | ◎ | ◎ | ◎ | ◎ | ◎ | ◎ | ◎ | ◎ | ◎ | ◎ |
| | | Curability | | | | ◎ | ◎ | ◎ | ◎ | ◎ | ◎ | ◎ | ◎ | ◎ | ◎ | ◎ |
| | | Strength of cured film | | | | ◎ | ◎ | ◎ | ◎ | ◎ | ◎ | ◎ | ◎ | ◎ | ◎ | ◎ |

TABLE 2

| | | | SP Value | Acid Value | Mw | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|---|---|---|---|---|---|
| Pigment | | Carbon black | | | | 2 | 2 | 2 | 2 | 2 | 2 | 2 | 2 | 2 | 2 | 2 | 2 |
| Mono-functional monomer | | Phenoxyethyl acrylate | 9.7 | | | 20 | 20 | 20 | 20 | 20 | 20 | 20 | 20 | 20 | 20 | 20 | 20 |
| | | Laury acrylate | 8.3 | | | 25 | 25 | 25 | 25 | 25 | 25 | 25 | 25 | 25 | 25 | 25 | 25 |
| | | Isobornyl acrylate | 7.2 | | | 30 | 30 | 30 | 30 | 30 | 30 | 30 | 30 | 30 | 30 | 30 | 30 |
| | | N-vinyl caprolactam | 10.5 | | | 15 | 15 | 15 | 15 | 15 | 15 | 15 | 15 | 15 | 15 | 15 | 15 |
| | | Vinyl formamide | 9.3 | | | | | | | | | | | | | | |
| Bi-functional monomer | | Hydroxypivalic acid neopentyl glycol diacrylate | | | | 10 | 10 | 10 | 10 | 10 | 10 | 10 | 10 | 10 | 10 | 10 | 10 |
| Resin | Styrene acrylic acid | ARUFON UH-2000 | | 0 | 11000 | 2 | | | | | | | | | | | |
| | | JONCRYL 815 | | 40 | 10000 | | 2 | | | | | | | | | | |
| | | JONCRYL 611 | | 53 | 8100 | | | 2 | | | | | | | | | |
| | | JONCRYL 586 | | 108 | 4600 | | | | 1 | 10 | | | | | | | |
| | | ARUFON UC-3920 | | 240 | 15000 | | | | | | 2 | | | | | | |
| | | JONCRYL 690 | | 240 | 17000 | | | | | | | 2 | | | | | |
| | Styrene maleic acid | 2625P | | 50 | 5000 | | | | | | | | | | 2 | | |
| | Poly-ester | A-1 | | 50 | 1000 | | | | | | | | | | | 2 | |
| | | A-2 | | 50 | 25000 | | | | | | | | | | | | 2 |
| | Acrylic acid | ARUFON UC-3900 | | 100 | 4600 | | | | | | | | | | | | 2 |

TABLE 2-continued

|  |  |  | SP Value | Acid Value | Mw | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|---|---|---|---|---|---|
| Polymerization inhibitor | | BHT | | | | 1 | 1 | 1 | 1 | 1 | 1 | 1 | 1 | 1 | 1 | 1 | 1 |
| Polymerization intiator | | TPO | | | | 2.5 | 2.5 | 2.5 | 2.5 | 2.5 | 2.5 | 2.5 | 2.5 | 2.5 | 2.5 | 2.5 | 2.5 |
| | | 369 | | | | 2.5 | 2.5 | 2.5 | 2.5 | 2.5 | 2.5 | 2.5 | 2.5 | 2.5 | 2.5 | 2.5 | 2.5 |
| | | Esa-one | | | | 2.5 | 2.5 | 2.5 | 2.5 | 2.5 | 2.5 | 2.5 | 2.5 | 2.5 | 2.5 | 2.5 | 2.5 |
| | | 819 | | | | 2.5 | 2.5 | 2.5 | 2.5 | 2.5 | 2.5 | 2.5 | 2.5 | 2.5 | 2.5 | 2.5 | 2.5 |
| Evaluation | Adhesion | PP | | | | ○ | ○ | ○ | ◎ | ◎ | ◎ | ○ | ◎ | ◎ | ◎ | ◎ | ◎ |
| | | PET | | | | ○ | ○ | ○ | ◎ | ◎ | ◎ | ○ | ◎ | ◎ | ◎ | ◎ | ◎ |
| | | PVC | | | | ◎ | ◎ | ◎ | ◎ | ◎ | ◎ | ◎ | ◎ | ◎ | ◎ | ◎ | ◎ |
| | | Acrylic | | | | ○ | ○ | ◎ | ◎ | ◎ | ◎ | ◎ | ◎ | ◎ | ◎ | ◎ | ◎ |
| | | Glass | | | | ○ | ○ | ○ | ◎ | ◎ | ◎ | ◎ | ◎ | ◎ | ◎ | ◎ | ◎ |
| | | Ejectability | | | | ◎ | ◎ | ◎ | ◎ | ◎ | ○ | ◎ | ◎ | ◎ | ◎ | △ | ◎ |
| | | Curability | | | | ◎ | ◎ | ◎ | ◎ | ◎ | ◎ | ◎ | ◎ | ◎ | ◎ | ◎ | ◎ |
| | | Strength of cured film | | | | ◎ | ◎ | ◎ | ◎ | ◎ | ◎ | ◎ | ◎ | ◎ | ◎ | ◎ | ◎ |

TABLE 3

|  |  |  | SP value | Acid value | Mw | Com. 1 | Com. 2 | Com. 3 | Com. 4 | Com. 5 | Com. 6 | Com. 7 | Com. 8 | Com. 9 |
|---|---|---|---|---|---|---|---|---|---|---|---|---|---|---|
| Pigment | | Carbon black | | | | 2 | 2 | 2 | 2 | | 2 | 2 | | |
| Monofunctional monomer | | Phenoxyethyl acrylate | 9.7 | | | 70 | 20 | 35 | 55 | | 20 | 20 | | |
| | | Laurl acrylate | 8.3 | | | 20 | 10 | | | | 25 | 70 | | |
| | | Isobornyl acrylate | 7.2 | | | | 60 | | 30 | 30 | 30 | | 80 | 25 |
| | | N-vinyl caprolactam | 10.5 | | | | | 55 | 15 | 15 | | | 10 | 70 |
| | | Vinyl formamide | 9.3 | | | | | | | | 15 | | | |
| Bi-functional monomer | | Hydroxypivalic acid neopentyl glycol diacrylate | | | | 10 | 10 | 10 | | 55 | 10 | 10 | 10 | 5 |
| Resin | Stylene acrylic acid | ARUFON UH-2000 | | 0 | 11000 | | | | | | | | | |
| | | JONCRYL 815 | | 40 | 10000 | | | | | | | | | |
| | | JONCRYL 611 | | 53 | 8100 | | | | | | | | | |
| | | JONCRYL 586 | | 108 | 4600 | 2 | 2 | 2 | 2 | 2 | 2 | | 2 | 2 |
| | | ARUFON UC-3920 | | 240 | 15000 | | | | | | | | | |
| | | JONCRYL 690 | | 240 | 17000 | | | | | | | | | |
| | Stylene maleic acid | 2625P | | 50 | 5000 | | | | | | | | | |
| | Polyester | A-1 | | 50 | 1000 | | | | | | | | | |
| | | A-2 | | 50 | 25000 | | | | | | | | 2 | |
| | Acrylic acid | ARUFON UC-3900 | | 100 | 4600 | | | | | | | | | |
| Polymerization inhibitor | | BHT | | | | 1 | 1 | 1 | 1 | 1 | 1 | 1 | 1 | 1 |
| Polymerization initiator | | TPO | | | | 2.5 | 2.5 | 2.5 | 2.5 | 2.5 | 2.5 | 2.5 | 2.5 | 2.5 |
| | | 369 | | | | 2.5 | 2.5 | 2.5 | 2.5 | 2.5 | 2.5 | 2.5 | 2.5 | 2.5 |
| | | Esa-one | | | | 2.5 | 2.5 | 2.5 | 2.5 | 2.5 | 2.5 | 2.5 | 2.5 | 2.5 |
| | | 819 | | | | 2.5 | 2.5 | 2.5 | 2.5 | 2.5 | 2.5 | 2.5 | 2.5 | 2.5 |
| Evaluation | Adhesion | PP | | | | × | × | × | △ | × | △ | × | △ | × |
| | | PET | | | | × | △ | × | △ | × | △ | × | △ | × |
| | | PVC | | | | × | × | △ | △ | ○ | △ | × | △ | × |
| | | Acrylic | | | | × | △ | × | △ | × | △ | × | △ | × |
| | | Glass | | | | × | △ | × | △ | × | △ | × | △ | × |
| | | Ejectability | | | | ◎ | ◎ | ◎ | ◎ | ◎ | ◎ | △ | ◎ | ◎ |
| | | Curability | | | | × | △ | ◎ | ○ | ◎ | ○ | × | △ | × |
| | | Strength of cured film | | | | — | × | ◎ | × | ◎ | × | — | × | — |

R551: Kayarad R551, manufactured by Nippon Kayaku Co., Ltd., ethoxylated or propoxylated bisphenol A diacrylate
ARUFON UH-2000: manufactured by Toagosei Co., Ltd.
JONCRYL 815: manufactured by BASF Corp.
JONCRYL 611: manufactured by BASF Corp.
JONCRYL 586: manufactured by BASF Corp.
ARUFON UC-3920: manufactured by Toagosei Co., Ltd.
JONCRYL 690: manufactured by BASF Corp.
2625P: SMA 2625P, manufactured by Elf Atochem Japan Co., Ltd.
ARUFON UC-3900: manufactured by Toagosei Co., Ltd.
BHT: dibutylhydroxytoluene
TPO: Lucirin TPO, manufactured by BASF Corp., 2,4,6-trimethylbenzoyldiphenylphosphine oxide
369: IRGACURE 369, manufactured by Ciba Geigy, Inc., 2-benzyl-2-dimethylamino-1-(-4-morpholinopropane)butanone-one
Esa-one: ESACURE ONE, manufactured by Lamberti Corp., oligo(2-hydroxy-2-methyl-1-(4-(1-methylvinyl)phenyl)propanone)
819: IRGACURE 819, manufactured by Ciba Geigy, inc., bis(2,4,6-trimethylbenzoyl)-phenylphosphine oxide In Examples 1 to 23, the inks of the present invention were used, and therefore, the inks are excellent in the adhesiveness to various base materials, ejectability, curability, and cured film strength.

In the ink of Example 8, 15% or more of N-vinylcaprolactam are contained based on the total amount of the polymerizable monomers, and 25% or more of isobornyl acrylate are contained based on the total amount of the polymerizable monomers, and the total amount of lauryl acrylate and isobornyl acrylate, which are monofunctional monomers having an SP value of 8.5 or less, was 35% or more based on the total amount of the polymerizable monomers. Thus, the ink exhibits excellent adhesiveness.

The ink of Example 1 has a resin content of 2% and has more excellent adhesiveness as compared with the ink of Example 18, which has a resin content of 1%.

The inks of Examples 1 to 11, 13 to 21 and 23 contain resins having a weight average molecular weight of 1000 to 20000, and have more excellent ejectability as compared with the ink of Example 22 containing a resin having a weight average molecular weight of 25000. The inks of Examples 1 to 16, 18 to 21 and 23 contain resins having a weight average molecular weight of 1000 to 15000, and have more excellent ejectability as compared with the ink of Example 17 containing a resin having a weight average molecular weight of 17000.

The ink of Comparative Example 1 does not contain isobornyl acrylate and N-vinyl caprolactam, and thus as poor adhesiveness and curability.

The ink of Comparative Example 2 does not contain N-vinyl caprolactam, and has poor curability and cured film strength. The ink also has significantly deteriorated adhesiveness as compared with the ink of Example 2.

The ink of Comparative Example 3 does not contain isobornyl acrylate, and has poor adhesiveness.

The ink of Comparative Example 4 has a proportion of monofunctional monomers of greater than 98% (100%), and has poor cured film strength. Thus, the ink has poor adhesiveness.

The ink of Comparative Example 5 has a proportion of monofunctional monomers of less than 60% (45%), and has poor adhesiveness due to the effect of the curing contraction.

The ink of Comparative Example 6 makes use of other vinyl monomers instead of N-vinyl caprolactam, but the cured film strength has been decreased. Thus, the ink has poor adhesiveness.

The ink of Comparative Example 7 does not contain isobornyl acrylate and N-vinyl caprolactam, and has poor adhesiveness and curability. The ink of Comparative Example 8 has a proportion of isobornyl acrylate of greater than 65% (80%) and a proportion of N-vinyl caprolactam of less than 12.5% (10%). Thus, there occur defects in curing, and the ink has poor adhesiveness and cured film strength.

The ink of Comparative Example 9 has a proportion of N-vinyl caprolactam of greater than 60% (70%), and thus the ink cannot form a cured film, and has poor curability and adhesiveness.

What is claimed is:

1. An active energy ray-curable inkjet ink composition comprising:
    polymerizable monomers, the polymerizable monomers comprising 60 to 98% by weight of monoethylenically unsaturated monomers, the monoethylenically unsaturated monomers comprising 25 to 65% by weight of isobornyl acrylate and 12.5 to 60% by weight of N-vinyl caprolactam based on the total amount of the polymerizable monomers, and
    a resin having an acid value of 50 mg KOH/g or higher and a weight average molecular weight of 1000 to 20000.

2. The active energy ray-curable inkjet ink composition according to claim 1, wherein said resin has a weight average molecular weight of 1000 to 15,000.

3. A printed matter printed with the active energy ray-curable inkjet ink composition according to claim 1.

4. The printed matter according to claim 3, wherein said printed matter is printed on a base material surface treated by introducing a polar group into the surface of the base material.

5. The active energy ray-curable inkjet ink composition according to claim 1, wherein said resin is present in from 1 to 10% by weight based on the total amount of the polymerizable monomers.

6. The active energy ray-curable inkjet ink composition according to claim 1, further comprising pigment.

7. The active energy ray-curable inkjet ink composition according to claim 6, further comprising a pigment dispersant.

8. The active energy ray-curable inkjet ink composition according to claim 1, wherein said composition has a viscosity at 25° C. of 5 to 200 mPa·s.

9. The active energy ray-curable inkjet ink composition according to claim 6, wherein said composition has a viscosity at 25° C. of 5 to 200 mPa·s.

* * * * *